United States Patent
Shimoyama

(10) Patent No.: US 7,642,004 B2
(45) Date of Patent: Jan. 5, 2010

(54) HOLDER FOR COOLING BATTERY MODULES

(75) Inventor: Yoshiro Shimoyama, Inzai (JP)

(73) Assignee: Hyundai Motor Company, Seoul (KR)

( * ) Notice: Subject to any disclaimer, the term of this patent is extended or adjusted under 35 U.S.C. 154(b) by 397 days.

(21) Appl. No.: 11/648,764

(22) Filed: Dec. 29, 2006

(65) Prior Publication Data
US 2008/0124620 A1     May 29, 2008

(30) Foreign Application Priority Data
Nov. 29, 2006    (KR) .................... 10-2006-0118847

(51) Int. Cl.
*H01M 10/50* (2006.01)
*H01M 2/10* (2006.01)
*H01M 2/00* (2006.01)

(52) U.S. Cl. .................... 429/120; 429/99; 429/163

(58) Field of Classification Search .............. 429/120, 429/99, 163
See application file for complete search history.

(56) References Cited

U.S. PATENT DOCUMENTS
6,335,116 B1 * 1/2002 Yamane et al. .............. 429/176

FOREIGN PATENT DOCUMENTS

| JP | 11-329518 | 11/1999 |
|---|---|---|
| JP | 2000-223099 | 8/2000 |
| JP | 2004-047361 | 2/2004 |
| JP | 2005-183343 | 7/2005 |

* cited by examiner

*Primary Examiner*—Patrick Ryan
*Assistant Examiner*—Thomas H. Parsons
(74) *Attorney, Agent, or Firm*—Morgan, Lewis & Bockius LLP

(57) ABSTRACT

A holder for cooling battery modules that that maintains a temperature difference between plural battery modules below a specific value, reduces the number of module support parts, and ensures improvement of assembly performance and reduction of manufacturing cost by supplying cooling air to pass by the battery modules mounted in a hybrid vehicle and the like.

6 Claims, 2 Drawing Sheets

HOLDER FOR COOLING BATTERY MODULES

CROSS-REFERENCE TO RELATED APPLICATION

This application claims the benefit of Korean Patent Application No. 10-2006-0118847, filed on Nov. 29, 2006, the entire disclosure of which is hereby incorporated by reference.

BACKGROUND OF THE INVENTION

1. Field of the Invention

The present invention relates to a holder for cooling battery modules and, more particularly, to a holder for cooling battery modules that maintains a temperature difference between plural battery modules below a specific value, reduces the number of module support parts, and ensures improvement of assembly performance and reduction of manufacturing cost by supplying cooling air to pass by the battery modules mounted in a hybrid vehicle and the like.

2. Description of Related Art

In general, the battery of a vehicle is a part for supplying electric power to the respective elements of the vehicle and repeats charge and discharge by loads of electronic devices and a generation unit of the vehicle. During such a process, the temperature rise of the battery causes some problems in that the internal resistance in the battery is changed, the electric performance is deteriorated and thereby efficient electricity management of the vehicle is not established.

As the development and application of hybrid vehicles and high voltage batteries such as 36V has advanced the need for lowering the internal temperature of the battery to an appropriate level has been raised. For example, Japanese Patent Publication No. 2003-308888 has disclosed a structure in which various cooling air rectifying members are established in cooling air inlets, cooling air outlets and an inner surface of the battery case so as to change the flow direction and the flow rate of the cooling air, thus cooling plural battery modules and, at the same time, maintaining the temperature difference between the respective battery modules at a specific value.

Moreover, Japanese Patent Publication No. 2005-183343 has disclosed a battery case in which the flow area of cooling air is reduced toward the downstream of the cooling air so that flow rate of the cooling air is increased to uniformly cool plural battery modules mounted therein.

However, the above-described patent for maintaining the plural battery modules at a specific temperature has some drawbacks in that the module support structure is complicated and accompanied with increases in the dimension, weight, number of parts and manufacturing cost, since various parts such as cooling air baffle plates, guide grooves, cooling air rectifying members, etc., are provided in the cooling air inlets, the cooling air outlets and the inner surface of the battery case. Moreover, since the gaps between the battery modules are small, it requires greater cooling air flow and further causes an increase in cooling fan power.

SUMMARY OF THE INVENTION

Embodiments of the present invention provide a holder for cooling battery modules in which cooling air passing by battery modules in a straight line radiates heat generated in the battery modules by force to lower the temperature of the battery modules to an appropriate temperature, thus maintaining the battery performance in an optimal state, reducing the number of module support parts, and ensuring improvement of assembly performance and reduction of manufacturing cost.

In an exemplary embodiment of the present invention a holder for cooling battery modules comprises a housing, in which a plurality of battery modules is mounted, and cooling air inlets and outlets are established; and first and second air panels established on the cooling air inlets and outlets, respectively, wherein the battery modules are arranged in the form of a straight line from the cooling air inlets to the cooling air outlets so that cooling air paths are formed.

As a further exemplary embodiment, the plural battery modules are arranged parallel to the cooling air flow direction, a plurality of gaps in the form of a straight line is formed between the battery modules arranged in one direction, and the cooling air passes through the gaps.

As another exemplary embodiment, the cooling air inlets are positioned on the same line as the gaps. Moreover, a plurality of cooling air inlet paths is formed by the first air panels on the cooling air inlets and the first air panels are arranged in the form of a trumpet so that inlet areas of the cooling air inlet paths become smaller.

Furthermore, a plurality of cooling air outlet paths is formed by the second air panels on the cooling air outlets and the second air panels are arranged in the form of a trumpet so that outlet areas on the upstream side of the cooling air outlets are relatively larger than those on the middle side thereof.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Figure 1:
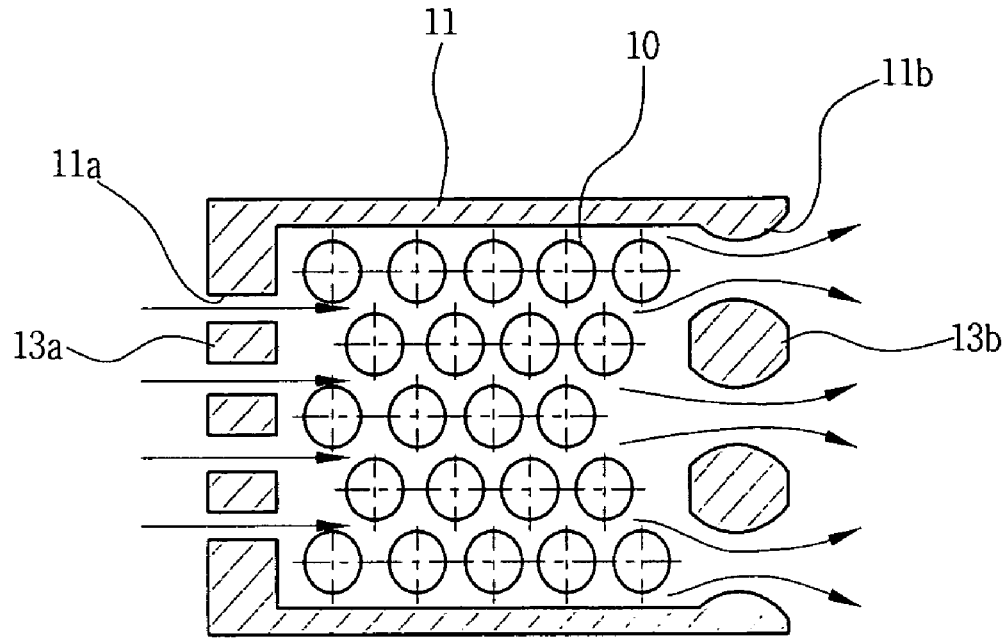
FIG. 1 is a cross-sectional view depicting a holder for cooling battery modules in accordance with an exemplary embodiment of the present invention.
Figure 2:
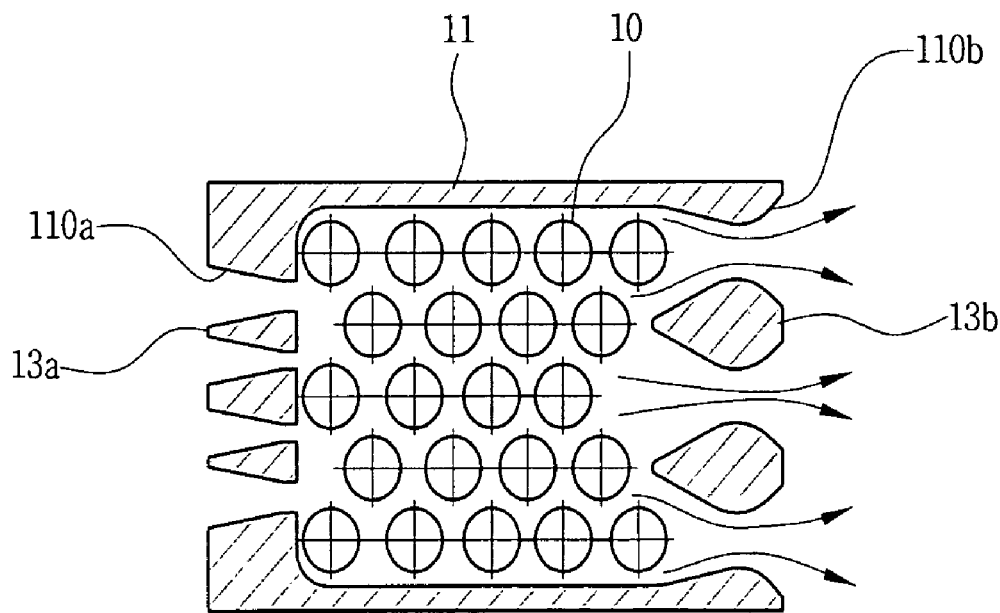
FIG. 2 is a cross-sectional view depicting a holder for cooling battery modules in accordance with another exemplary embodiment of the present invention.
Figure 3:
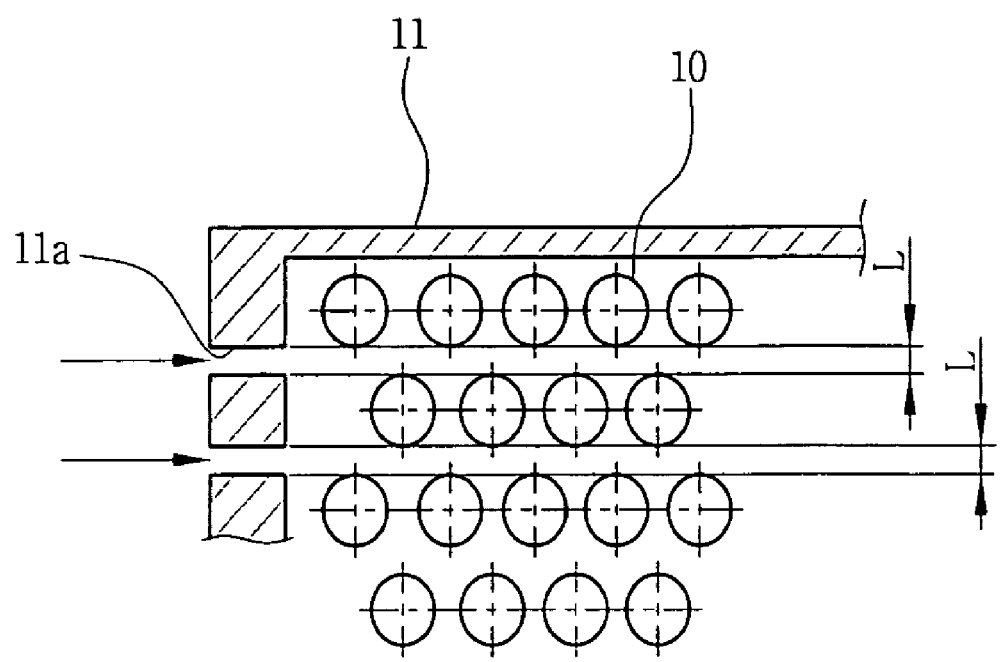
FIG. 3 is a cross-sectional view illustrating gaps between battery modules and cooling air inlets.

Hereinafter, exemplary embodiments of the present invention will now be described in detail with reference to the attached drawings.

As seen in the attached drawings, embodiments of the present invention provide a holder for cooling battery modules 10 included in a vehicle that can increase the straightness of cooling air so as to readily forward the cooling air to the battery modules positioned in the downstream of the cooling air.

In one exemplary embodiment, a holder for cooling battery modules in accordance with the present invention comprises a housing 11 in which cooling air inlets 11a and cooling air outlets 11b are formed. Trumpet-shaped first and second air panels 13a and 13b are disposed at the inlets 11a and the outlets 11b.

The cooling air inlets 11a are formed on one end portion of the housing 11 and the cooling air outlets 11b are established on the other end portion of the housing 11. Moreover, the housing is fabricated in the form of a straight line so that cooling air can be passed from the inlets 11a to the outlets 11b smoothly.

A plurality of the battery modules 10 is arranged in the form of plural straight lines at regular intervals in the housing 11. Gaps L are established parallel to the cooling air flow between the battery modules in the up and down directions.

The battery modules 10 may be arranged in a manner that each of the lower battery modules 10 is positioned below a space between two adjacent upper battery modules 10. That is, the battery modules on the upper and lower sides may be arranged zigzag.

A plurality of cooling air inlet paths is established between the air panels 13a of the cooling air inlets 11a in the vertical direction. The cooling air inlet paths become narrower in width along with the cooling air flow direction to create the straightness of the cooling air flow direction.

Moreover, the cooling air inlet paths are positioned on the same line as the gaps L. That is, aligning those positions allows the cooling air to pass by the gaps L between the battery modules readily so that the low temperature of the cooling air may not be easily lost in the battery modules in the upstream of the cooling air, but the straightness of the cooling air is increased to improve the cooling performance in the battery modules in the downstream of the cooling air, thus suppressing the temperature difference between the respective battery modules below a specific value.

A plurality of cooling air outlet paths is established by the trumpet-shaped air panels 13b on the outlets 11b of the housing 11. Here, the upstream and downstream sides of the cooling air outlet paths are formed relatively smaller than the middle portions of the cooling air outlet paths to improve the straightness of the cooling air.

According to exemplary embodiments of the present invention configured as described above, in which the cooling air inlet paths and outlet paths are integrally formed with the housing, various separate module support parts such as cooling air baffle plates, guide grooves, cooling air rectifying members, etc., are not required. Moreover, the assembly process of the holder for cooling battery modules is simplified by the above-described configuration and thereby the assembly performance is increased, thus shortening the assembly time and reducing the manufacturing cost of the holder for cooling battery modules.

As described above, according to the holder for cooling battery modules in accordance with embodiments of the present invention, it is possible to increase the straightness of the cooling air to improve the cooling performance of the battery modules by establishing the trumpet-shaped air panels on the cooling air inlets and outlets of the housing and aligning the cooling air inlets' positions and the gaps' positions between the respective battery modules.

Moreover, since the cooling air inlet paths and outlet paths are integrally formed with the housing, the assembly process of the holder for cooling battery modules is simplified and thereby the assembly time is shortened and the manufacturing cost of the holder for cooling battery modules is reduced.

As above, exemplary embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A holder for cooling battery modules, comprising:
a housing, in which a plurality of battery modules is mounted with cooling air inlets and outlets defined therein; and
first and second air panels including the cooling air inlets and outlets, respectively, wherein the first air panel is formed to an inlet portion of the housing and the second air panel is formed to an outlet portion of the housing,
wherein the battery modules are arranged in the form of a straight line from the cooling air inlets to the cooling air outlets so that cooling air paths are formed therebetween, and
wherein the cooling air inlets are shaped of a trumpet in the first air panels, inlet cross sectional areas on a downstream side of the cooling air inlets becoming smaller than those on a middle side thereof so that a plurality of cooling air inlet paths are formed to be straight.

2. The holder for cooling battery modules as recited in claim 1, wherein:
the plural battery modules are arranged parallel to the cooling air flow direction:
a plurality of gaps in the form of a straight line are formed between the battery modules arranged in one direction; and
the cooling air passes through the gaps.

3. The holder for cooling battery modules as recited in claim 2, wherein the cooling air inlets are positioned on the same line as the gaps.

4. The holder for cooling battery module as recited in claim 1, wherein the cooling air outlets formed in the second air panels are shaped of a trumpet so that outlet cross sectional areas on an upstream side of the cooling air outlets become relatively larger than those on a middle side thereof.

5. A holder for cooling battery modules, comprising:
a housing, in which a plurality of battery modules is mounted with cooling air inlets and outlets defined therein; and
first and second air panels including the cooling air inlets and outlets, respectively, wherein the first air panel is formed to an inlet portion of the housing and the second air panel is formed to an outlet portion of the housing,
wherein the battery modules are arranged in the form of a straight line from the cooling air inlets to the cooling air outlets so that cooling air paths are formed therebetween, and
wherein the cooling air outlets formed in the second air panels are shaped of a trumpet so that outlet cross sectional areas on an upstream side of the cooling air outlets become relatively larger than those on a middle side thereof.

6. A holder for cooling battery modules, comprising:
a housing, in which a plurality of battery modules is mounted with cooling air inlets and outlets defined therein; and
first and second air panels including the cooling air inlets and outlets, respectively, wherein the first air panel is formed to an inlet portion of the housing and the second air panel is formed to an outlet portion of the housing,
wherein the battery modules are arranged in the form of a straight line from the cooling air inlets to the cooling air outlets so that cooling air paths are formed therebetween,
wherein the cooling air inlets are shaped of a trumpet in the first air panels, inlet cross sectional areas on a downstream side of the cooling air inlets becoming smaller than those on a middle side thereof so that a plurality of cooling air inlet paths are formed to be straight, and
wherein the cooling air outlets formed in the second air panels are shaped of a trumpet so that outlet cross sectional areas on an upstream side of the cooling air outlets become relatively larger than those on a middle side thereof.

* * * * *

UNITED STATES PATENT AND TRADEMARK OFFICE
CERTIFICATE OF CORRECTION

PATENT NO. : 7,642,004 B2
APPLICATION NO. : 11/648764
DATED : January 5, 2010
INVENTOR(S) : Yoshiro Shimoyama Page 1 of 1

It is certified that error appears in the above-identified patent and that said Letters Patent is hereby corrected as shown below:

Title Page, Item (73) Assignees:

Add the two additional Assignees as listed below:

Hyundai Motor Company, Seoul (KR)
-- Hyundai Motor Japan R&D Center Inc., Inzai-City (JP)
Kia Motors Corporation, Seoul (KR) --

Signed and Sealed this
Nineteenth Day of March, 2013

Teresa Stanek Rea
*Acting Director of the United States Patent and Trademark Office*